(12) United States Patent  (10) Patent No.: US 8,447,137 B2
Buscema  (45) Date of Patent: May 21, 2013

(54) METHOD OF IMAGE FUSION

(75) Inventor: Paolo Massimo Buscema, Rome (IT)

(73) Assignees: CSI Ricerca & Ambiente SRL, Rome (IT); Semeion Centro Ricerche, Rome (IT)

( * ) Notice: Subject to any disclaimer, the term of this patent is extended or adjusted under 35 U.S.C. 154(b) by 174 days.

(21) Appl. No.: 13/085,240

(22) Filed: Apr. 12, 2011

(65) Prior Publication Data

US 2012/0263371 A1    Oct. 18, 2012

(51) Int. Cl.
*G06K 9/00* (2006.01)
*G06K 9/36* (2006.01)
*G06T 17/00* (2006.01)

(52) U.S. Cl.
USPC ........... 382/284; 382/154; 382/168; 382/128; 345/424

(58) Field of Classification Search
USPC ... 382/128, 154, 168, 284–285, 294; 345/424
See application file for complete search history.

(56) References Cited

U.S. PATENT DOCUMENTS

| | | | | |
|---|---|---|---|---|
| 6,549,651 B2 * | 4/2003 | Xiong et al. | | 382/154 |
| 6,754,379 B2 * | 6/2004 | Xiong et al. | | 382/154 |
| 7,397,934 B2 * | 7/2008 | Bloch et al. | | 382/128 |
| 7,715,654 B2 * | 5/2010 | Chefd'hotel et al. | | 382/294 |
| 7,995,864 B2 * | 8/2011 | Mullick et al. | | 382/294 |
| 8,031,211 B2 * | 10/2011 | Shekhar et al. | | 345/648 |
| 8,078,004 B2 * | 12/2011 | Kang et al. | | 382/276 |
| 8,165,401 B2 * | 4/2012 | Funayama et al. | | 382/190 |
| 8,184,129 B2 * | 5/2012 | Shekhar et al. | | 345/648 |
| 2007/0086678 A1 * | 4/2007 | Chefd'hotel et al. | | 382/294 |

* cited by examiner

*Primary Examiner* — Andrae S Allison
(74) *Attorney, Agent, or Firm* — Themis Law

(57) ABSTRACT

A method of fusing images includes the steps of providing at least two images of the same object, each image being a digital image or being transformed in a digital image formed by an array of pixels or voxels, and of combining together the pixels or voxels of the at least two images being combined to obtain a new image formed by the combined pixels or voxels.

5 Claims, 12 Drawing Sheets

*Desktop Wavelet*

*Desktop ACF*

*Desktop High Energy*

*Desktop Low Energy*

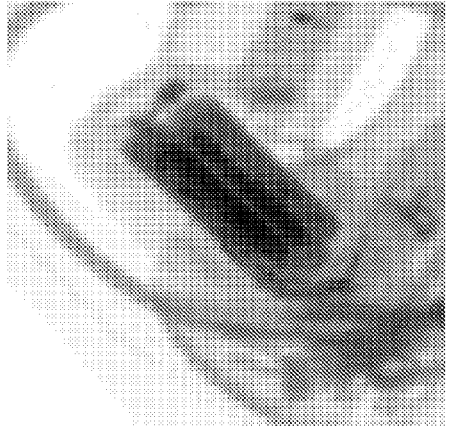
*Figure 1f: Details of ACF Fusion*
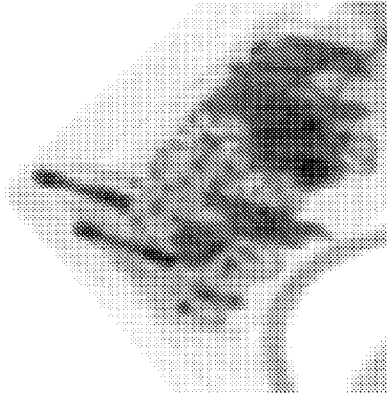
*Figure 1h: Details of ACF Fusion*
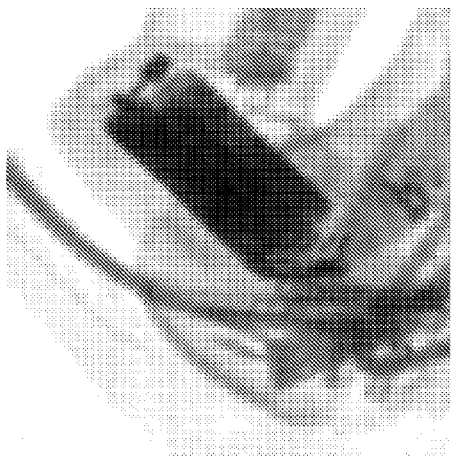
*Figure 1e: Details of Wavelet Fusion*
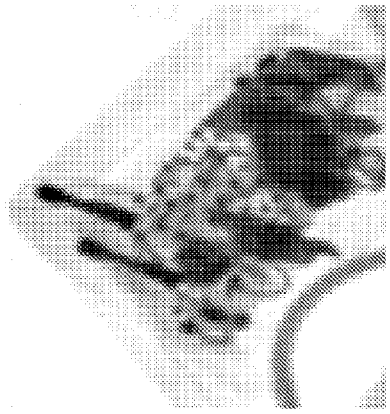
*Figure 1g: Details of Wavelet Fusion*

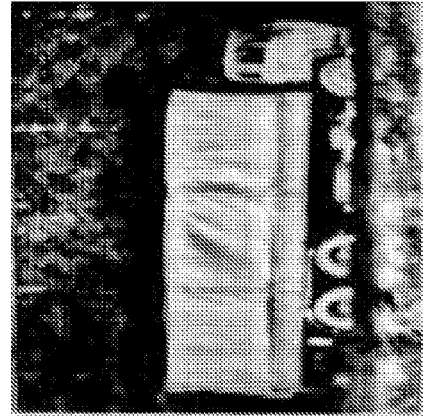
*Figure 2c: Standard fusion*
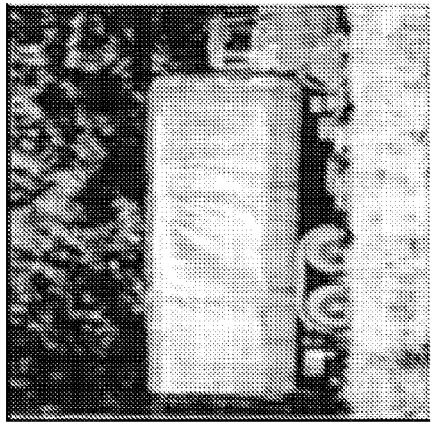
*Figure 2d: ACF fusion*
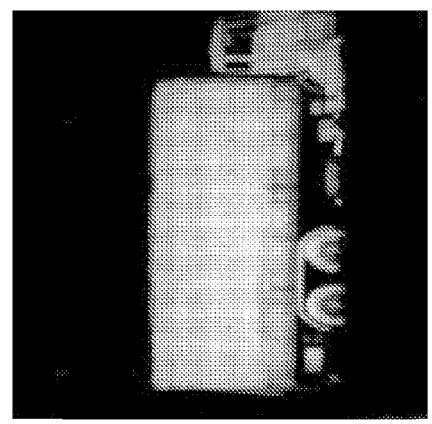
*Figure 2a: Infrared*
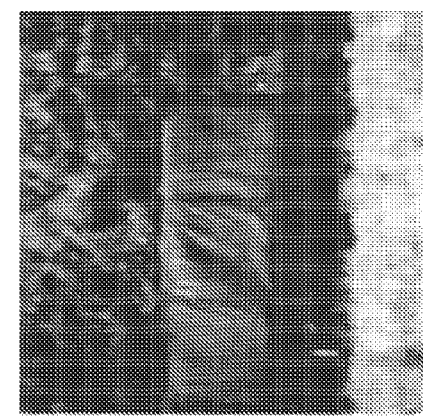
*Figure 2b: TV image*

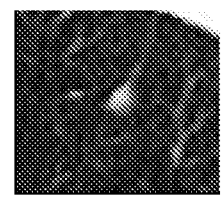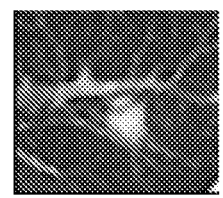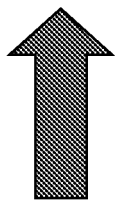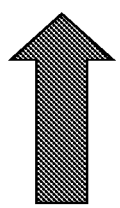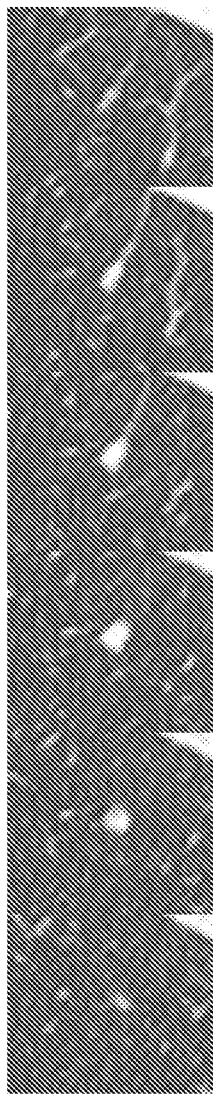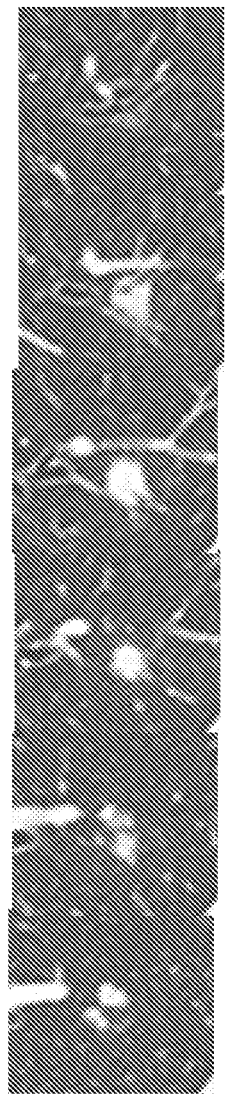
*Figure 3: A benign tumor*
*Figure 4: A malignant tumor*

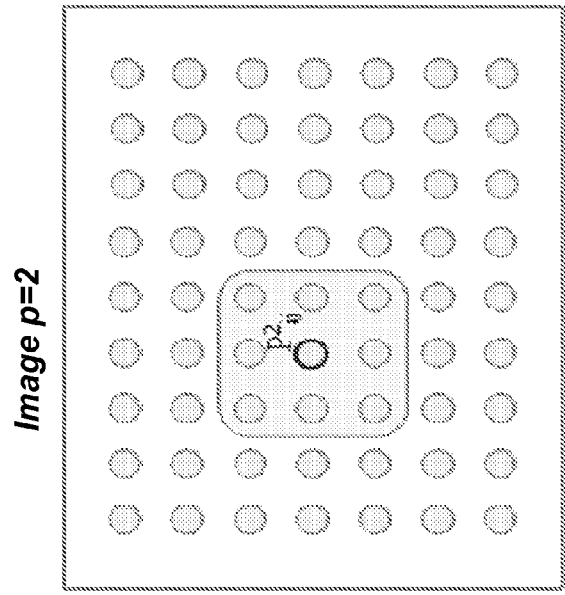
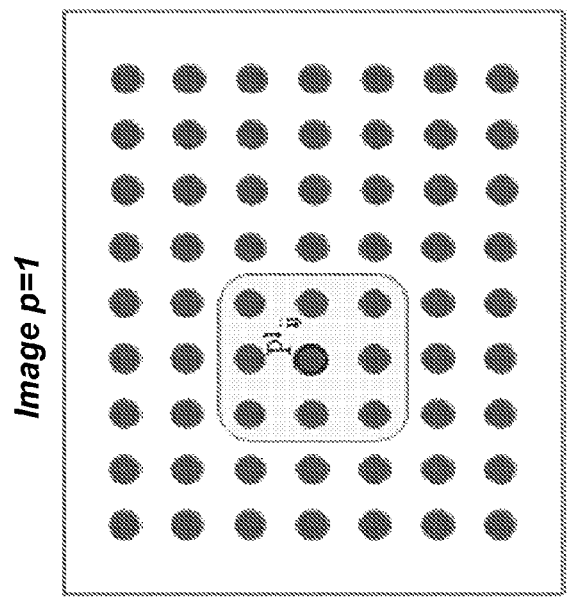
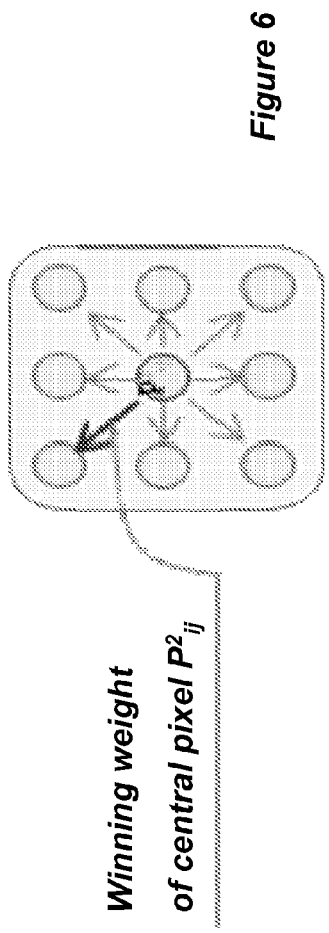
Figure 5
Figure 6

*Standard*
*Fusion according to the invention*
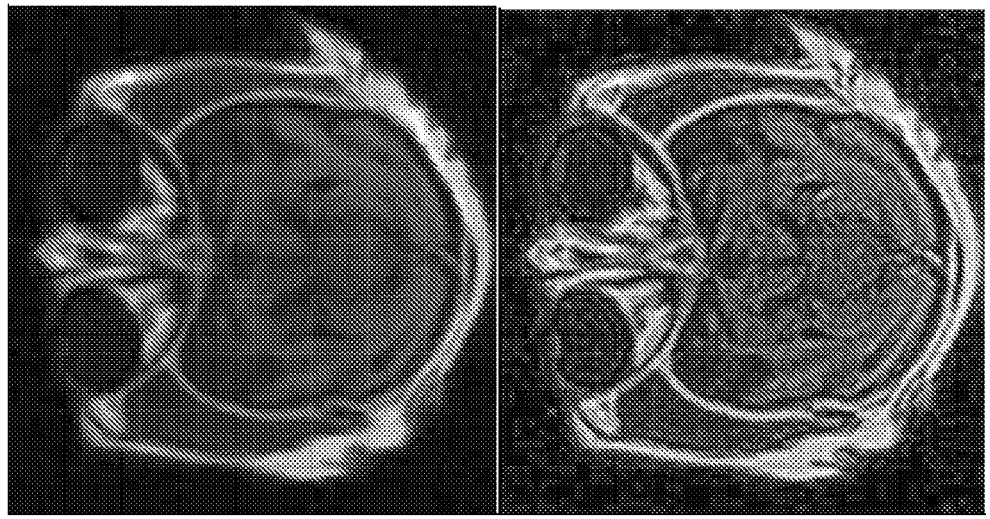
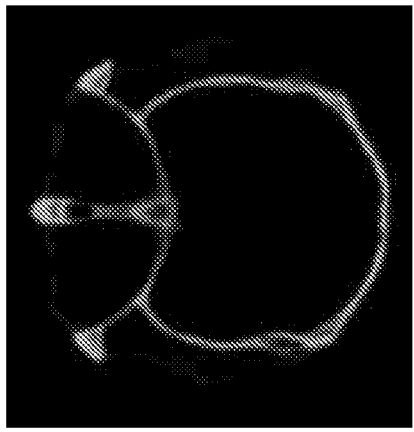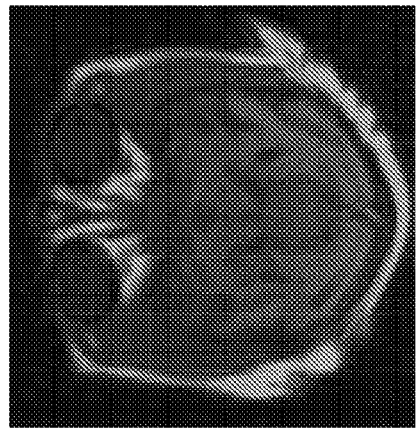
*CT and MRI*
*Figure 9*

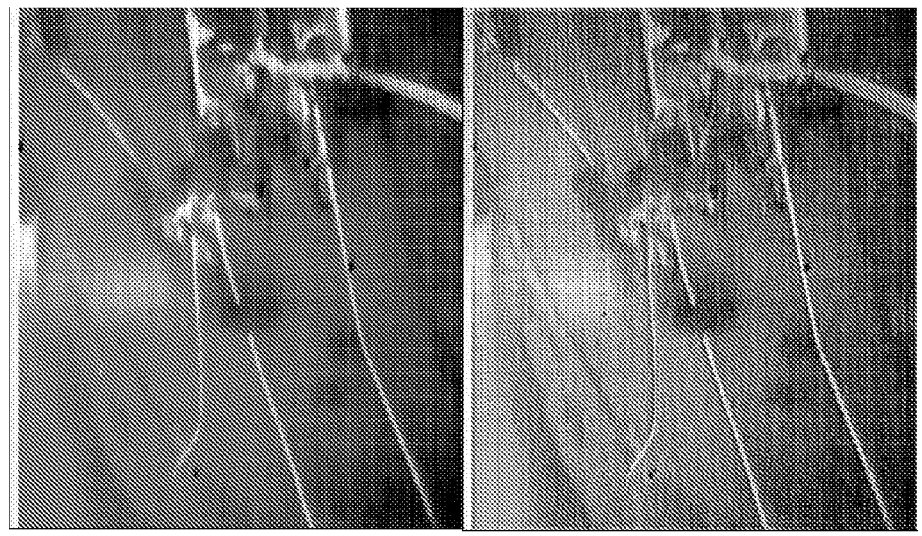
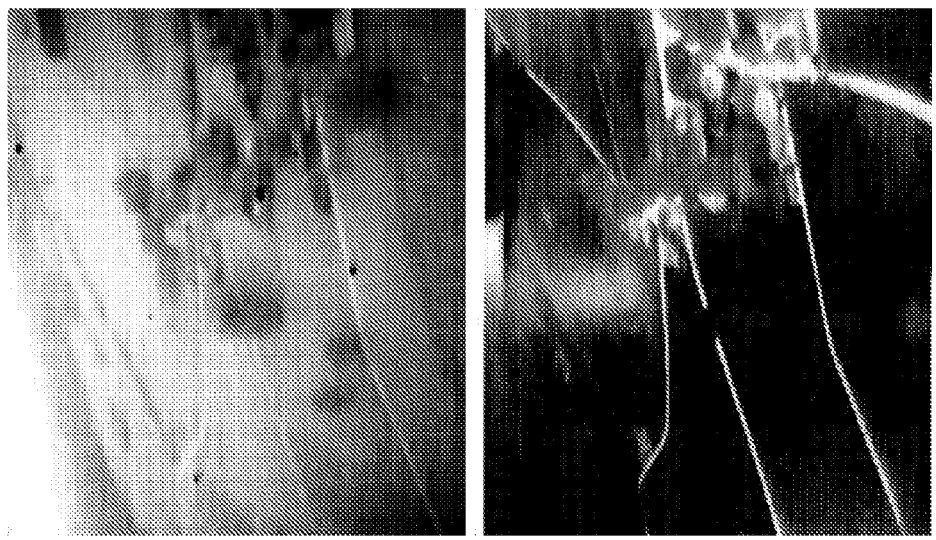
*Figure 10*

METHOD OF IMAGE FUSION

FIELD OF THE INVENTION

The invention relates to a method of fusing images, which includes the steps of providing at least two images of the same object, each image being a digital image or being transformed in a digital image formed by an array of pixels or voxels, and of combining together the pixels or voxels of the at least two images to obtain a new image formed by the combined pixels or voxels.

The present invention further relates to the field of image processing methods, which is presently of great relevance, particularly for robotics.

BACKGROUND OF THE INVENTION

The ability to see is recognized to reside mainly in the image processing phase, rather than in the image acquisition phase.

Acquisition is carried out by sensors, which are able to react to physical parameters, and the acquired image data is deprived of any interpretation of the content or significance of what the image data represent.

Image processing is carried out on critical image data and is a first step of the process that enables vision. This first step is far from an interpretation of the content or meaning of what the image data represent, i.e., it is far from any pure intellectual process, and is a mere technical process that is not influenced by data content or meaning Currently, many different methods of performing image fusion are known.

All these methods have the object of improving information content or intelligibility by combining together image data of at least two or, more generally, of a certain number of images of the same object. In most cases the at least two or more images are acquired using different image acquisition processes in order to integrate the image data information of one kind of image acquisition process with the image data information of another kind of image acquisition process. So, for example, two or more images of the same object or scene may be acquired, each or at least some of the images having different spectral ranges such as visual, infrared or UV spectral range. Other examples may use x-ray images, ultrasound images and/or MRI images as source images of an object. In this case, image data is acquired using different physical effects, each of which is sensible to different conditions or qualities of the imaged object and allows highlighting different particulars of the imaged object.

The importance of image preprocessing for the follow-on step of recognizing certain features and qualities of the imaged object, and thus interpreting the information data of the imaged object or scene, is being recognized as being a major contributor in continuously improving the methods of image processing.

SUMMARY OF THE INVENTION

The object of the present invention is to provide an improved method of carrying out image fusion, which allows obtaining improved results in enhancing the information contained in image data of at least two or more different images of the same object, while at the same time maintaining at least unchanged or even reducing the operative burden on a computing device, which executes a program for carrying out the method according to the present invention.

In one embodiment, the method of the present invention includes the step of providing at least two or more images m of the same subject or scene, each image being formed by an array of pixels or voxels $P_{i,j}^m$ arranged in row i and columns j.

The notation $P_{i,j}^m$ comprises not only the position data of the pixel in the array of pixels forming the image, but also the parameters defining pixel features, which are related to pixels appearance in the array of pixels forming the image. The parameters describing pixels features and appearance can be expressed according to one of the different systems currently known and used in this field, such as the RGB (Red, Green, Blue) parameters for the colors, and/or the HSB (Hue, Saturation, Brightness) or the HSL (Hue, Saturation, Lightness) parameters for the saturation of the pixel.

Similarly, in a variant embodiment, the method might be applied to the signals, from which the above pixel features are determined, for example, where the image has been acquired by physical means using a certain physical effect.

Furthermore, the term pixel is to be interpreted as comprising also the extension to the three dimensional equivalent in a three dimensional image or voxel, and for the sake of simplicity in the description a reference is made only to the two dimensional case, since a three dimensional image can be reduced to a certain number of two dimensional images each corresponding to a different slice of the three dimensional image.

In a first embodiment, for each pixel $P_{i,j}^m$ of each image m, the following steps are carried out:
Linear Stretching;
Non Linear Focusing;
Weights Initialization;
Delta Calculation;
Weights Update; and
Fused Image Visualization.

In a preferred version of this embodiment under the commercial name ACF Fusion, the above steps are carried out through the following equations:

Linear Stretching:

$$P(1)_{i,j}^m = F(P(0)_{i,j}^m) = Scale^m \cdot P(0)_{i,j}^m \cdot Offset^m;$$
$$P(1)_{i,j}^m \in [0,1]. \quad (1)$$

where:
$P(0)_{i,j}^m$ is the pixel at the row i column j of the image m of the m=1 to M images at the step 0 of the method;
$P(1)_{i,j}^m$ is the pixel at the row i column j of the image m of the m=1 to M images at the step 1 of the method, the step 1 consisting in the linear stretching step; and
where:

$$Scale^m = \frac{1,0}{Max^m - Min^m}$$

is a scaling factor for the m-th image of the m=1 to M images, and $$Offset^m = \frac{-Min^m}{Max^m - Min^m}$$

where:

$$Max^m = Max\{P(0)_{i,j}^m\}$$

$$Min^m = Min\{P(0)_{i,j}^m\}$$

Non Linear Focusing:
Legend:
M=Number of Source Images;

$$\bar{x}_{i,j} = \frac{1}{M} \cdot \sum_{m}^{M} P(1)_{i,j}^{m}; m \in [1, 2, \ldots, M]. \quad (2)$$

$$c_{i,j} = \frac{\bar{x}_{i,j}}{1.0 - \bar{x}_{i,j}}; \quad (3)$$

$$d_{i,j}^{m} = P(1)_{i,j}^{m} - \bar{x}_{i,j}; \quad (4)$$

$$P(2)_{i,j}^{m} = \frac{c_{i,j}}{c_{i,j} + e^{-d_{i,j}^{m}}}. \quad (5)$$

where:
$P(2)_{i,j}^{m}$ is the pixel at row I, column j of the image m of the m=1 to M images at step 2 of the method, step 1 consisting in the non linear focusing step.

Weights Initialization:
Legend:
R=Radius of Pixel Neighbourhood.

$$\sigma_{i,j}^{m} = \sum_{k=-R}^{R} \sum_{z=-R}^{R} (P(2)_{i,j}^{m} - P(2)_{i+k,j+z}^{m})^2; \quad (6)$$

$$\text{Win} = \underset{m}{\text{ArgMax}}\{\sigma_{i,j}^{m}\}; m \in [1, 2, \ldots, M]; \quad (7)$$

$$W_{i,j,i+k,j+z}^{(t)} = 2.0 \cdot P(2)_{i,j}^{\text{Win}} - 1.0; k, z \in [-R, +R]. \quad (8)$$

The radius of pixel neighborhood is defined by the number of steps from the target pixel to the last shell of pixels enclosing the target pixel.

Delta Calculation:
Each pixel of any image VS its neighbourhood:

$$\alpha_{i,j,i+k,j+z} = \frac{1}{M} \cdot \sum_{m}^{M} (P(2)_{i,j}^{m} - P(2)_{i+k,j+z}^{m})^2; \quad (9)$$

Each neighbourhood of an image VS each neighbour of the other images:

$$\beta_{i,j,i+k,j+z} = \frac{2}{M \cdot (M-1)} \cdot \sum_{n\neq}^{M-1} \sum_{m}^{M} (P(2)_{i+k,j+z}^{n} - P(2)_{i+k,j+z}^{m})^2; \quad (10)$$

Each central pixel of each image VS the neighbour of the other images:

$$\gamma_{i,j,i+k,j+z} = \sqrt[2]{\frac{2}{M \cdot (M-1)} \cdot \sum_{n\neq}^{M-1} \sum_{m}^{M} (P(2)_{i,j}^{n} - P(2)_{i+k,j+z}^{m})^2}; \quad (11)$$

$$\delta_{i,j,i+k,j+z} = \sqrt[2]{\frac{2}{M \cdot (M-1)} \cdot \sum_{n\neq}^{M-1} \sum_{m}^{M} (P(2)_{i+k,j+z}^{n} - P(2)_{i,j}^{m})^2}; \quad (12)$$

$$\varphi_{i,j,i+k,j+z} = \sqrt[2]{\alpha_{i,j,i+k,j+z} + \beta_{i,j,i+k,j+z}}; \quad (13)$$

$$\varphi_{i,j,i+k,j+z} = \gamma_{i,j,i+k,j+z} \cdot \delta_{i,j,i+k,j+z}. \quad (14)$$

Weights Update:

$$\psi_{i,j,i+k,j+z} = \frac{\varphi_{i,j,i+k,j+z}}{\phi_{i,j,i+k,j+z}}; \quad (15)$$

$$y = \psi_{i,j,i+k,j+z}; \quad (15a)$$

$$W_{i,j,i+k,j+z}^{(t+1)} = W_{i,j,i+k,j+z}^{(t)} + \frac{e^{-y} - e^{y}}{e^{-y} + e^{y}}. \quad (16)$$

Visualization:

$$\text{New}P_{i,j} = f\left(\frac{1}{(2 \cdot R + 1)^2} \cdot \sum_{k=-R}^{R} \sum_{z=-R}^{R} W_{i,j,i+k,j+z}^{(t)}\right); \quad (17)$$

in which for the function f(.) the following is valid $$f(\cdot) = \text{New}P_{i,j} \in [0,255]; \text{ Linear Stretching.} \quad (18)$$

The above method steps transform at least two or more source images into one new image and achieve the object of preserving the most important features and details of the source images into the new artificial image. The image fusion process according to the present invention generates a fused image, in which each pixel is determined from a set of pixels in each source image.

A particular field of application of the present method is the so-called multi-sensor fusion, which relates to the direct combination of several signals in order to provide a signal that has the same general format as the source signals, which signals are acquired by different sensors operating according to different physical effects.

According to a second embodiment of the present invention the method (commercial name ACF Net Wave) provides the following steps:
Weights Initialization;
Images Initialization;
Smallest Neighbor;
Weights Updating;
States Updating; and
Mean Weights Visualization.

Weights initialization is carried out according to the following equations:

$$w_{i,j,i+k,j+z}^{[n=0]} = 0.0;$$

n=cycles;

i ∈[1,2, . . . , R];

j ∈[1, 2, . . . , C];

k,z ∈[−G,+G].

R=Rows;

C=Columns;

G=NeighborRadius

Image initialization corresponds to the linear stretching of the previous embodiment:

$$a_{i,j}^{p[n=0]} = \text{Scale}^p \cdot x_{i,j}^p + \text{Offset}^p;$$

$$\text{Scale}^p = \frac{1.0}{\text{Max}^p - \text{Min}^p};$$

$$\text{Offset}^p = \frac{-\text{Min}^p}{\text{Max}^p - \text{Min}^p};$$

$$\text{Max}^p = \text{Max}\{x_{i,j}^p\};$$

$$\text{Min}^p = \text{Min}\{x_{i,j}^p\};$$

$$x_{i,j}^p = \text{Original Pixel}(i, j) \text{ of Image}(p);$$

$$a_{i,j}^{p[n]} = \text{Scaled and Stretched Pixel}(i, j) \text{ of Image}(p);$$

Neighbor smallest is defined by the following equations:

$$d_{i,j,i+k,j+z}^{p[n]} = \sum_{m=-G}^{G}\sum_{n=-G}^{G}\left(a_{i+m,j+n}^{p[n]} - w_{i+m,j+n,i+k,j+z}^{[n]}\right)^2;$$

$$r_{i,j}^{*[n]} = \arg\min_{i+k}\left\{d_{i,j,i+k,j+z}^{p[n]}\right\};$$

$$c_{i,j}^{*[n]} = \arg\min_{j+z}\left\{d_{i,j,i+k,j+z}^{p[n]}\right\};$$

$$s_{i,j}^{*[n]} = \arg\min_{p}\left\{d_{i,j,i+k,j+z}^{p[n]}\right\};$$

The equations describing the updating of the weights are:

$$w_{i+k,j+z,r_{i,j}^*,c_{i,j}^*}^{[n+1]} = w_{i+k,j+z,r_{i,j}^*,c_{i,j}^*}^{[n]} + \alpha \cdot \left(a_{i+k,j+z}^{s_{i,j}^{*[n]}} - w_{i+k,j+z,r_{i,j}^*,c_{i,j}^*}^{[n]}\right); \quad (5)$$

$$\overline{w_{i,j}^{[n]}} = \frac{1}{(1+2\cdot G)^2} \cdot \sum_{k=-G}^{G}\sum_{z=-G}^{G} w_{i+k,j+z,r_{i,j}^*,c_{i,j}^*}^{[n]};$$

while the equations describing the updating of the states are:

$$\begin{cases} a_{i+k,j+z}^{p[n+1]} = a_{i+k,j+z}^{p[n]} + \alpha \cdot \left(1.0 - a_{i+k,j+z}^{p[n]}\right) \cdot \left(w_{i+k,j+z,r_{i,j}^*,c_{i,j}^*}^{[n]} - \overline{w_{i,j}^{[n]}}\right) & \text{if } \left(w_{i+k,j+z,r_{i,j}^*,c_{i,j}^*}^{[n]} > \overline{w_{i,j}^{[n]}}\right) \\ a_{i+k,j+z}^{p[n+1]} = a_{i+k,j+z}^{p[n]} + \alpha \cdot a_{i+k,j+z}^{p[n]} \cdot \left(w_{i+k,j+z,r_{i,j}^*,c_{i,j}^*}^{[n]} - \overline{w_{i,j}^{[n]}}\right) & \text{if } \left(w_{i+k,j+z,r_{i,j}^*,c_{i,j}^*}^{[n]} < \overline{w_{i,j}^{[n]}}\right) \end{cases}$$

The visualization of the mean weights is carried out according to the following equations:

$$\text{Pixel}_{i,j}^{[n]} = \text{ScaleW} \cdot \overline{w_{i,j}^{[n]}} + \text{OffsetW};$$

$$\text{ScaleW} = \frac{\text{HighestPixelsResolution} - \text{LowestPixelsResolution}}{\text{MaxW} - \text{MinW}};$$

$$\text{OffsetW} = \frac{\text{MaxW} \cdot \text{LowestPixelsResolution} - \text{MinW} \cdot \text{HighestPixelsResolution}}{\text{MaxW} - \text{MinW}};$$

$$\text{MaxW} = \text{Max}_{i,j}\{\overline{w_{i,j}^{[n]}}\};$$

$$\text{MinW} = \text{Min}_{i,j}\{\overline{w_{i,j}^{[n]}}\}.$$

Also in this example, the notation $x_{i,j}^p$ and $a_{i,j}^{p[n]}$ includes not only the position data of the pixel in the array of pixels forming the image, but also the parameters defining pixel features which are related to pixels appearance in the array of pixels forming the image. The parameters describing pixels features and appearance can be expressed according to one of the different systems currently known and used in the field such as the RGB parameters for the colors and/or the HSB (Hue, Saturation, Brightness) or the HSL (Hue, Saturation, Lightness) parameters for the saturation of the pixel.

Similarly, in a variant, the method can also be applied to signals from which the above pixel features are determined, for example, where the image has been acquired by physical means using a certain physical effect.

Furthermore, the term pixel is still to be interpreted as including the extension to the three dimensional equivalent in a three dimensional image or voxel, and for the sake of simplicity in the description a reference is made to a two dimensional case, since a three dimensional image can be reduced to a certain number of two dimensional images, each corresponding to a different slice of the three dimensional image.

BRIEF DESCRIPTION OF THE DRAWINGS

FIGS. 1e and 1f illustrate a first enlarged particular of FIGS. 1c and 1d.

FIGS. 1g and 1h illustrate a second enlarged particular of FIGS. 1c and 1d.

FIGS. 2a and 2b show respectively a first infrared image and a TV image of a truck.

FIGS. 2c and 2d show respectively the image obtained by the fusion of images 2a and 2b using the traditional wavelet method and the image obtained by the fusion of images 2a and 2b using the method according to the first described example of a method according to the present invention.

FIG. 3 show a certain number of diagnostic images of a benign tumor and the image obtained by the fusion of the number of images.

FIG. 4 show similar images as in FIG. 3 but of a malignant tumor.

FIGS. 5 to 7 are schematic representations of the steps of the method of a second embodiment of the present invention.

FIGS. 8 to 10 show several examples, in which the image obtained from the fusion of two source images with the method of the second embodiment is compared to the image obtained by fusion with a method according to the state of the art.

DETAILED DESCRIPTION OF EMBODIMENTS OF THE INVENTION

FIGS. 1a to 4 illustrate examples of use of the first embodiment of the method (ACF Fusion) according to the present invention.

EXAMPLE 1

Figure 1C:
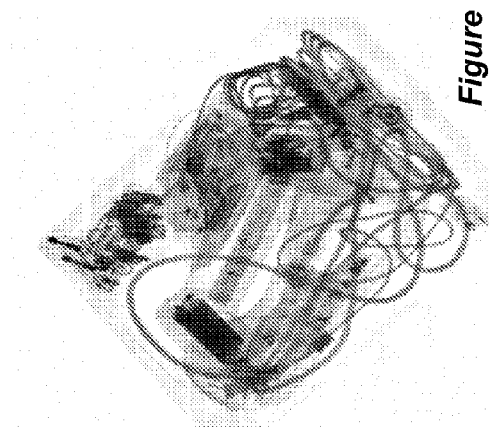
FIGS. 1a to 1d illustrate respectively images of a bag acquired at high energy, at low energy, generated by a conventional wavelet fusion method from the high energy and low energy images and generated using a first embodiment of the image fusion method of the present invention.
Figure 1D:
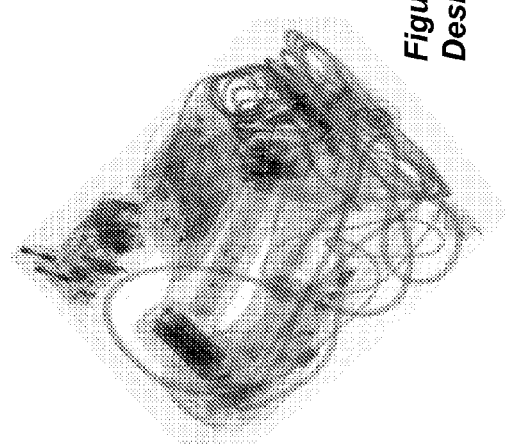
Figure 1A:
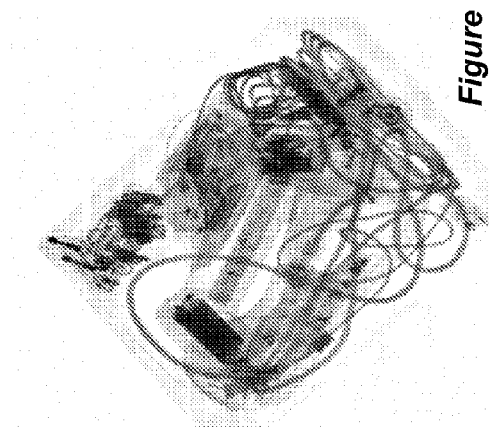
Figure 1B:
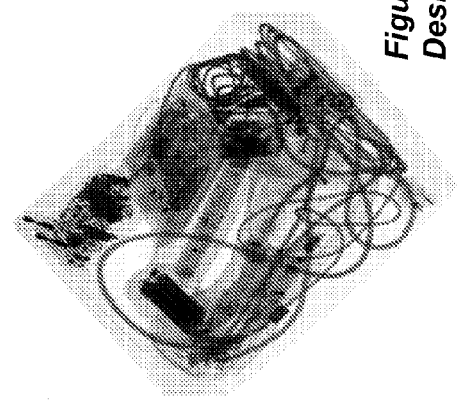

In FIG. 1a and 1b, there are two images of x-rays with high and low energy of a desktop computer. The target in this field is to preserve the penetration of high x-ray energy and the sensitivity toward the details of low x-ray energy.

In FIGS. 1c and 1d, the images obtained by fusion of the images of FIG. 1a and 1b are shown and compared with fusion images, which are obtained respectively by a wavelet fusion method according to the state of the art and by means of the algorithms according to the first embodiment of the present invention. In FIGS. 1e, 1f, 1g and 1h, the details of the images generated by the two different fusion algorithms are shown.

By simply visually comparing the images of FIG. 1c with those of FIG. 1d and correspondingly the details of FIG. 1e and FIG. 1g with those of respectively FIGS. 1f and 1h, it is evident how the first embodiment of a method according to the present invention is much more informative than a wavelet algorithm in terms of detail preservation, noise elimination and global image enhancement.

EXAMPLE 2

FIGS. 2a to 2d show the same comparison of fusion images as in Example 1 but here the source images of figures 1a and 1b are respectively an infrared image and a TV image of a truck.

Again, fusion is carried out by means of the wavelet method and by means of the first embodiment of the present invention.

The comparison between two fused images (2c-2d) shows that the image fusion generated by the algorithm according to the method of the present invention evidences a greater level of detail than the image generated by means of the traditional wavelet algorithm.

EXAMPLE 3

In this example a fused image obtained by means of a method according to the first embodiment of the present invention is shown on the right side of the image. On the left of the arrow, the source images consist of a series of images of the same ROI. From the figures it appears clearly how the fusion of the several source images in one new image by means of a method according to the present invention has a great effectiveness in the medical field, in particular as applied to MDCT (multidetector computed tomography).

In particular, the source images in FIG. 3 and FIG. 4 are images of different slices of a benign and of a malignant tumor and for each of the tumors the fused image is obtained by a method according to the present invention. The artificial image appears clearly to have better detail than each of the different slice images.

Figure 7:
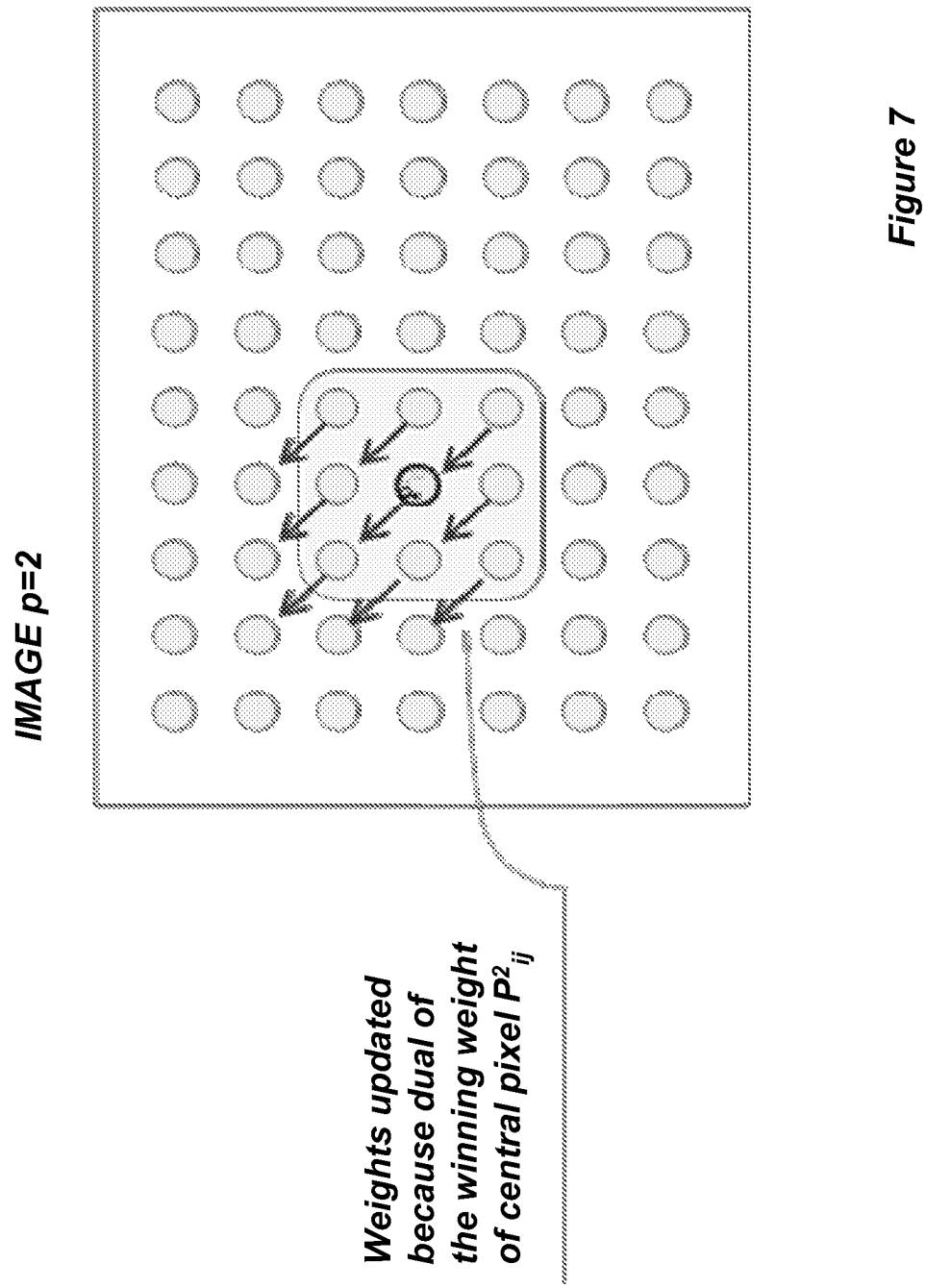

FIGS. 5 to 7 are schematic views, by means of which the steps of a second embodiment (ACF Net Wave) of a method for generating an image by fusing two source images are explained relatively to their principal or generic meaning.

In FIG. 5, two source images are shown. A first image is defined by index p=1 and a second image is defined by index p=2. Each image is formed by an array of pixels respectively $P_{ij}^1$ and $P_{ij}^2$.

The square 10 comprising 3×3 pixels defines a pixel neighborhood of the central pixel having a radius R=1, since the radius corresponds to the number of pixel shells around the central pixel.

The first step consisting in Weights Initialization and sets the initial value of the weights $w_{i,j,i+k,j+z}^{[n=0]}$ of the connection between the central pixel of the pixel neighborhood (called also window) and each of the pixels of the window to a value 0.0 for the first cycle n=0 of the method:

$$w_{i,j,i+k,j+z}^{[n=0]} = 0.0;$$

$$n = \text{cycles};$$

$$i \in [1, 2, \ldots, R];$$

$$j \in [1, 2, \ldots, C];$$

$$k, z \in [-G, +G].$$

$$R = \text{Rows};$$

$$C = \text{Columns};$$

$$G = \text{NeighborRadius}$$

I, j are indexes which can assume any value between 1 and respectively the number of rows and columns of the array of pixels forming the image, and k, z are indexes for the elements of the window centered on each target pixel, which can assume any value between the negative and the positive neighbor radius.

When, as in the present example, the pixel neighbor radius is equal to 1 the window of pixels centered at a certain target pixel has nine pixels in the form of a 3×3 array of pixels.

The second step of the method consists in the scaling and offsetting of the pixels of the source images p=1 and p=2. $a_{i,j}^{p[n]}$ is the variable of the value of the pixels which has been scaled and corrected at each method cycle [n] with the value of the pixels changing at every cycle of elaboration of image p.

$$a_{i,j}^{p[n=0]} = \text{Scale}^p \cdot x_{i,j}^p + \text{Offset}^p;$$

$$\text{Scale}^p = \frac{1.0}{\text{Max}^p - \text{Min}^p};$$

$$\text{Offset}^p = \frac{-\text{Min}^p}{\text{Max}^p - \text{Min}^p};$$

$$\text{Max}^p = \text{Max}\{x_{i,j}^p\};$$

$$\text{Min}^p = \text{Min}\{x_{i,j}^p\};$$

$$x_{i,j}^p = \text{Original Pixel}(i, j) \text{ of Image}(p);$$

$$a_{i,j}^{p[n]} = \text{Scaled and Stretched Pixel}(i, j) \text{ of Image}(p);$$

In the third step, the smallest neighbor is determined. FIG. 6 is illustrative of the principal effects of this step on the image pixels.

When, as in the present example, the radius of the pixel neighborhood is G=1, eight distances are calculated. The number of the distances corresponds to the number of the weights between the central pixel and the neighbor pixels within the window of pixel neighborhood radius G=1.

Then, the nine quadratic deviations of each pixel of the neighborhood relative to the weight connecting this pixel to the central pixel of the pixel neighborhood are computed.

As a further step, the indexes k and z are selected which identify the winning weight, which is the weight determining the minimum distance $d^{i,j,i+k,j+z p^{[n]}}$ relative to the central pixels $P_{i,j}^1$ e $P_{i,j}^2$ of the pixel windows of the images p=1 and p=2:         (3)

$$d_{i,j,i+k,j+z}^{p[n]} = \sum_{m=-G}^{G} \sum_{n=-G}^{G} \left(a_{i+m,j+n}^{p[n]} - w_{i+m,j+n,i+k,j+z}^{[n]}\right)^2;$$

$$r_{i,j}^{*[n]} = \arg\min_{i+k}\{d_{i,j,i+k,j+z}^{p[n]}\};$$

$$c_{i,j}^{*[n]} = \arg\min_{j+z}\{d_{i,j,i+k,j+z}^{p[n]}\};$$

$$s_{i,j}^{*[n]} = \arg\min_{p}\{d_{i,j,i+k,j+z}^{p[n]}\};$$

where $w_{i,j,r^*,c^*}^{s^{*[n]}}$ is the winning weight of the central pixel $P_{i,j}$.

The following step, in which at each cycle the weights are updated, consists in updating only the weights of the neighborhood of the central pixel $P_{i,j}$, which are dual of the winning weight $w_{i,j,r^*,c^*}^{s^{*[n]}}$ because they have the same direction.

The new value to be assigned to the pixel in the position i, j which results from the fusion of the two pixels $P_{i,j}^1$ and $P_{i,j}^2$, respectively of image p=1 and image p=2, is determined by the mean value $\overline{w_{i,j}^{[n]}}$ of the weights of the pixels of the neighborhood which has been updated in the direction of the winning weight.

$$w_{i+k,j+z,r_{i,j}^*,c_{i,j}^*}^{[n+1]} = w_{i+k,j+z,r_{i,j}^*,c_{i,j}^*}^{[n]} + \alpha \cdot \left(a_{i+k,j+z}^{s_{i,j}^{*[n]}} - w_{i+k,j+z,r_{i,j}^*,c_{i,j}^*}^{[n]}\right); \quad (5)$$

$$\overline{w_{i,j}^{[n]}} = \frac{1}{(1+2\cdot G)^2} \cdot \sum_{k=-G}^{G}\sum_{z=-G}^{G} w_{i+k,j+z,r_{i,j}^*,c_{i,j}^*}^{[n]};$$

The follow-on steps are as already described:
updating of the states $$\begin{cases} a_{i+k,j+z}^{p[n+1]} = a_{i+k,j+z}^{p[n]} + \alpha \cdot \left(1.0 - a_{i+k,j+z}^{p[n]}\right) \cdot \left(w_{i+k,j+z,r_{i,j}^*,c_{i,j}^*}^{[n]} - \overline{w_{i,j}^{[n]}}\right) & \text{if } \left(w_{i+k,j+z,r_{i,j}^*,c_{i,j}^*}^{[n]} > \overline{w_{i,j}^{[n]}}\right) \\ a_{i+k,j+z}^{p[n+1]} = a_{i+k,j+z}^{p[n]} + \alpha \cdot a_{i+k,j+z}^{p[n]} \cdot \left(w_{i+k,j+z,r_{i,j}^*,c_{i,j}^*}^{[n]} - \overline{w_{i,j}^{[n]}}\right) & \text{if } \left(w_{i+k,j+z,r_{i,j}^*,c_{i,j}^*}^{[n]} < \overline{w_{i,j}^{[n]}}\right) \end{cases}$$

and visualization of the mean weights:

$$Pixel_{i,j}^{[n]} = ScaleW \cdot \overline{w_{i,j}^{[n]}} + OffsetW;$$

$$ScaleW = \frac{HighestPixelsResolution - LowestPixelsResolution}{MaxW - MinW};$$

$$OffsetW = \frac{MaxW \cdot LowestPixelsResolution - MinW \cdot HighestPixelsResolution}{MaxW - MinW};$$

$$MaxW = \max_{i,j}\{\overline{w_{i,j}^{[n]}}\};$$

$$MinW = \min_{i,j}\{\overline{w_{i,j}^{[n]}}\}.$$

Figure 8:
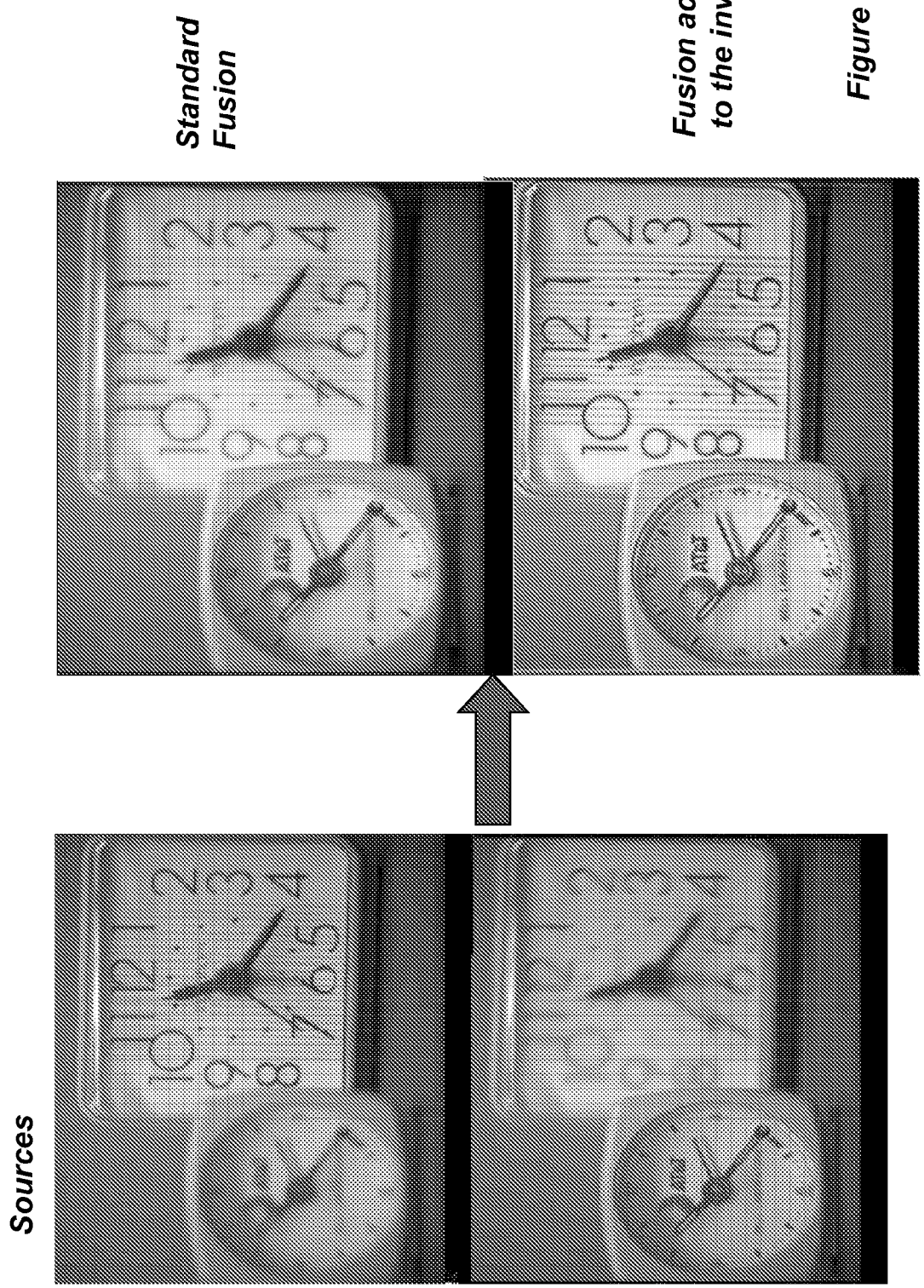

FIGS. 8 to 10 show several examples, in which the image obtained from the fusion of two source images with the method of the second embodiment of the present invention is compared to the image obtained by fusion with a method according to the state of the art.

EXAMPLE 3

Two source images of two clocks, where the images respectively of only a different one of the two clocks are sharp, are fused together by using a standard fusion method according to the state of the art and the method according to the above described second embodiment of the invention.

A visual comparison immediately shows that only the fusion image obtained by means of the method according to the invention was able to reproduce both clocks in a sharp way.

EXAMPLE 4

The source images are a CT (cat scan) and a MRI (magnetic resonance imaging) image of the head, showing different details. Again the images were fused by using a standard method and the method according to the second embodiment of the present invention. As it appears clearly, only the fusion image obtained using the method according to the present invention shows the details of the first and of the second source images, while the image obtained by standard means does not show similar details for the brain tissues.

EXAMPLE 5

The source images here are two differently acquired landscape photographs. The images were fused obtaining a new image as in the previous examples using a standard fusion method and the method according to the second embodiment of to the present invention.

Again, the image obtained with the method according to the present invention has more detail and reveals more information than the one generated by standard means.

The following examples 6 to 8 are limited to demonstrating the effectiveness of the fusion method according to the present invention without comparing it to the standard fusion methods.

EXAMPLE 6

Figure 11:
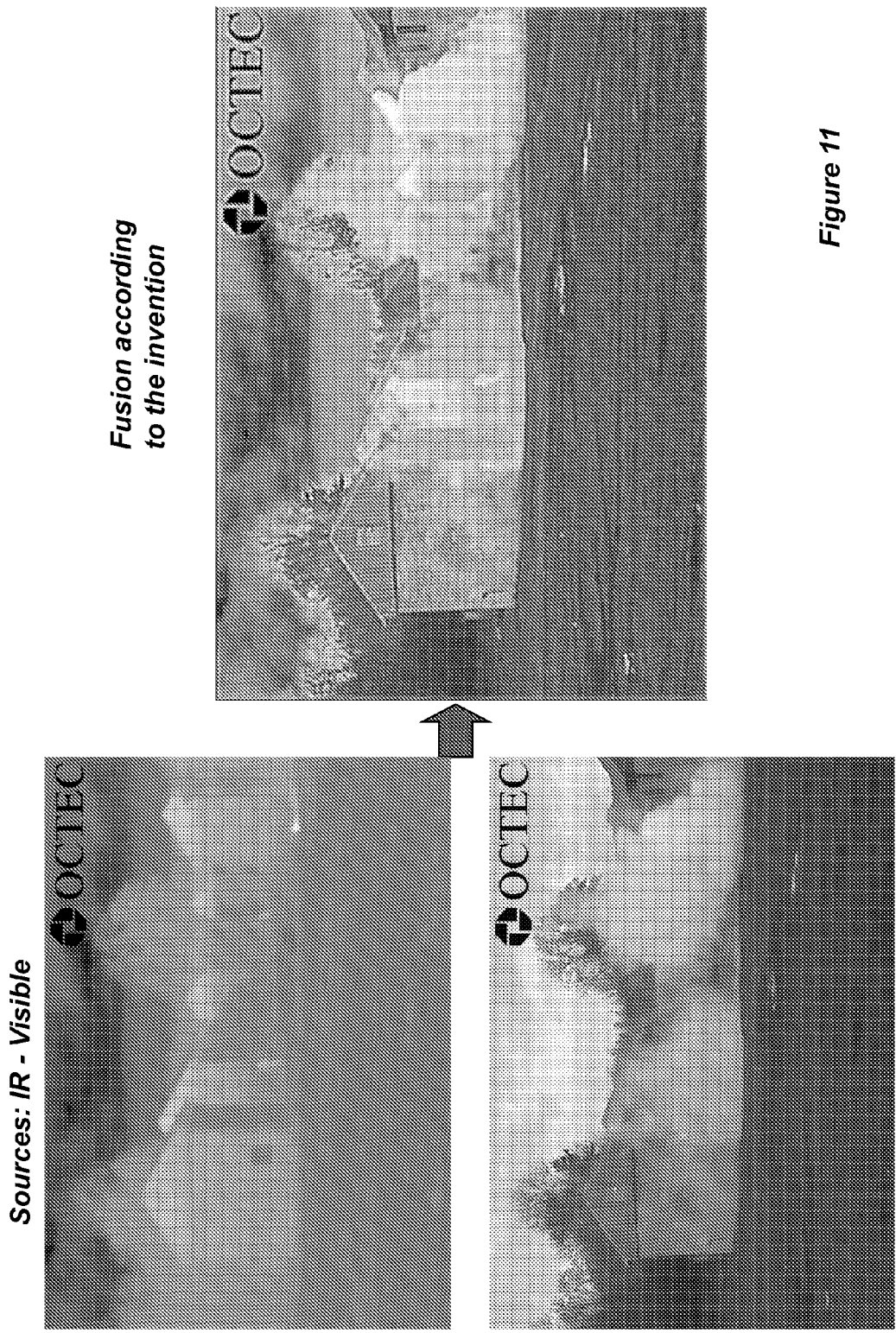
FIGS. 11 to 13 show three different examples of an image obtained by the fusion of two source images obtained by treating the source images according to the second embodiment of the present invention.

FIG. 11 shows two source images: one infrared image and one image in the visible part of the spectrum of the same subject. In the image taken in the visual part of the spectrum, smoke clouds cover part of the subject. In the infrared image some details do not appear. On the left side, the image generated by the fusion method according to the second embodiment of the invention is shown. As it appears clearly, the image generated by fusion reveals details which were partially not visible in the IR and in the visible image. More particularly, in the fused image the structure in the center of the image is clearly visible, while this structure does not appear in the IR image and only partially in the visible image.

EXAMPLE 7

Figure 12:
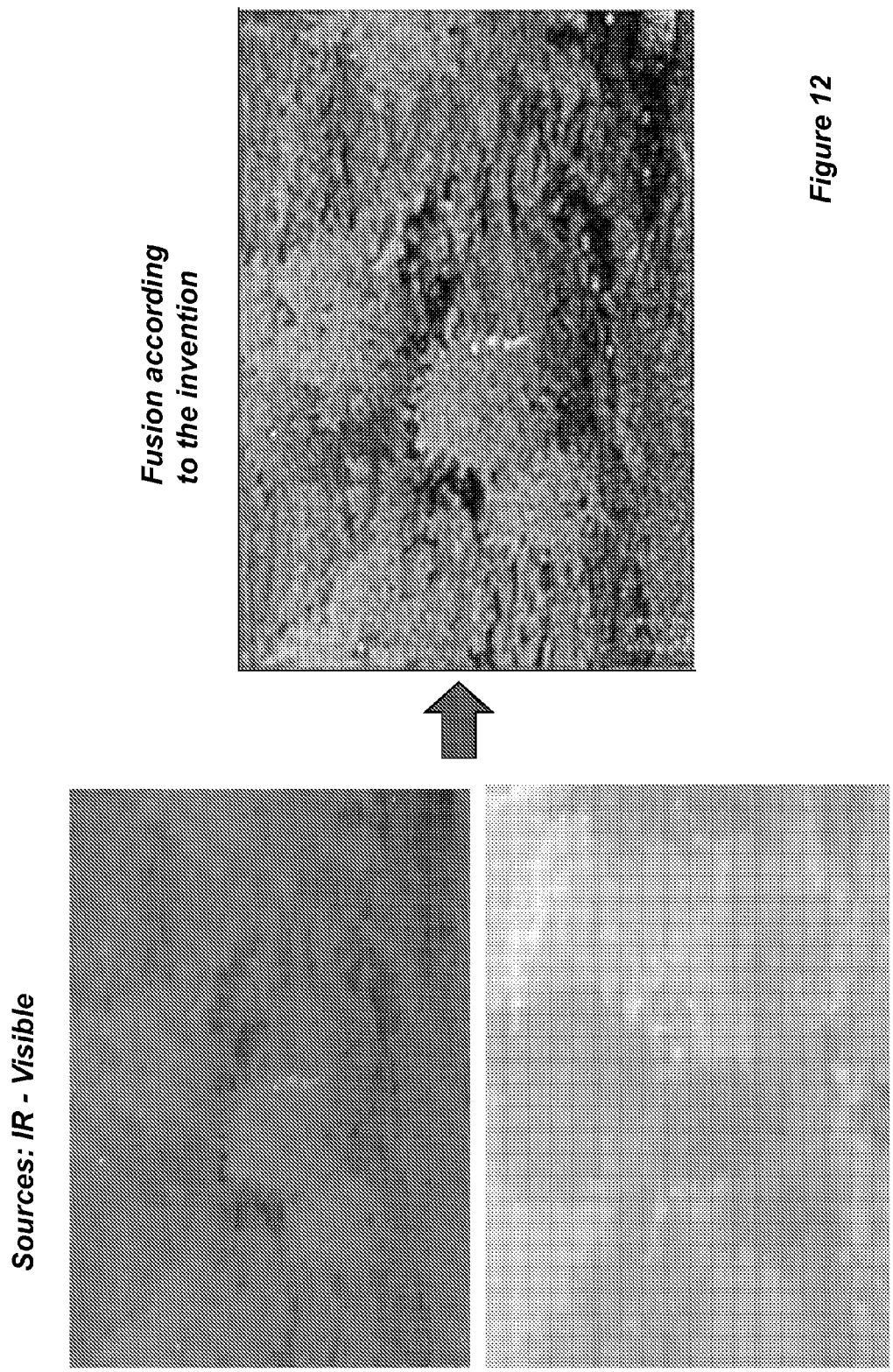

FIG. 12 is an example similar to the example of FIG. 11. In this example, a person is hidden in the wood. In the IR image the person can be detected but with a very poor detail, while in the visible image the person is not visible at all. The fused image reveals the person in a very clear way and with more detail and more brightness than in the source images.

EXAMPLE 8

Figure 13:
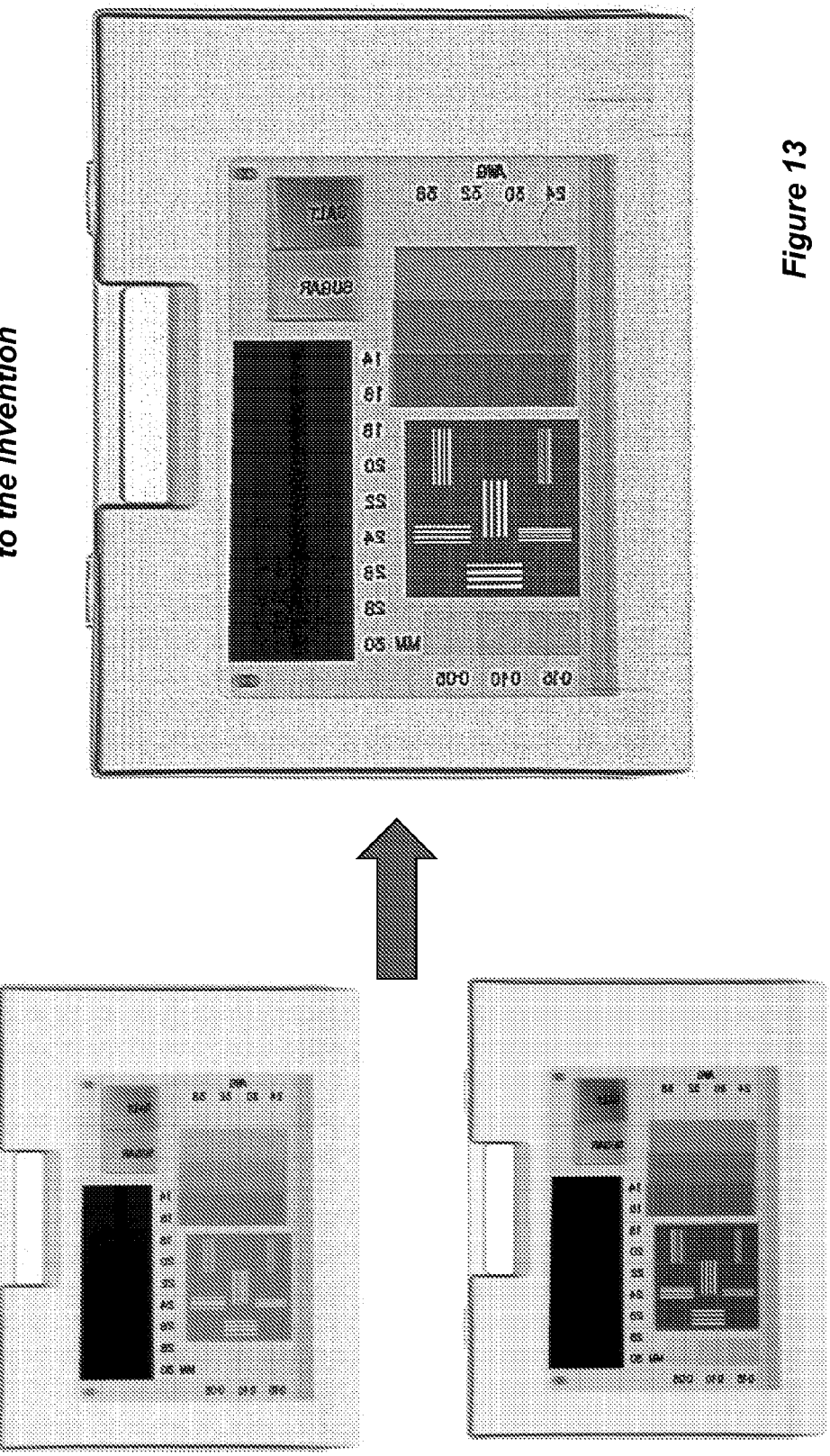

FIG. 13 shows two source images, which are x-ray images of a bag containing a test phantom. The two images are taken with different energies of x-ray radiation. The phantom has structures with predetermined patterns, which allow evaluating the level of detail, the resolution, the contrast and additional qualities of the image.

Also in this example, the image generated by the method according to the present invention has better resolution, contrast and more detail than the source images, showing the effectiveness in enhancing image quality.

According to still another example, which is not illustrated, the present method can be applied to at least two source images consisting in only one and the same image, which is used as the first and as the second source image. Carrying out the fusion method to this single image, the fused image obtained shows more detail and has netter quality than the source image.

In regard to the above method, it must be stressed that since the method aims at obtaining an image from the fusion of at least two source images, the step of visualizing the fused image is part of the method. Visualizing can be carried out either by printing the image on paper or by displaying the image on a screen.

As an alternative, the new image can be printed as numerical parameters representing the values of the pixels.

A further improvement consists in using the image obtained by the present fusion method as a starting image for carrying out image processing by means of one or more image processing methods. This image processing method can be one or a combination of the currently known image processing methods, or also any kind of processing methods, for example, of image pattern recognition or for s-called computer aided diagnostics applied to diagnostic images.

According to still another improvement, the methods in the above two embodiments can be used in combination one with the other, for example by generating two fusion images from the same source images and then carrying out a fusion of the two fusion images generated independently by the methods according to the two embodiments.

A further variant may provide that the fusion image generated by the method according to the first or to the second embodiment is fed twice as two identical input or source images to the method according to another embodiment for generating a fusion image.

Additional variants based on the different possible combinations of the two embodiments of the method may be possible and are disclosed in an implicit way by the above description.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:

1. A method of fusing images comprising the steps of:
providing at least two images of the same object, each image being a digital image or being transformed in a digital image formed by an array of pixels or voxels and the pixels or voxels of the at least two images being combined together to obtain a new image formed by the combined pixels or voxels using of the following steps defined in terms of equations:

Weights initialization:

$$w_{i,j,i+k,j+z}^{[n=0]} = 0.0;$$

$$n = \text{cycles};$$

$$i \in [1, 2, \ldots, R];$$

$$j \in [1, 2, \ldots, C];$$

$$k, z \in [-G, +G];$$

$$R = \text{Rows};$$

$$C = \text{Columns};$$

$$G = \text{NeighborRadius}$$

Image initialization:

$$a_{i,j}^{p[n=0]} = \text{Scale}^p \cdot x_{i,j}^p + \text{Offset}^p;$$

$$\text{Scale}^p = \frac{1.0}{\text{Max}^p - \text{Min}^p};$$

$$(\text{Offset})^p = \frac{-\text{Min}^p}{\text{Max}^p - \text{Min}^p};$$

$$\text{Max}^p = \text{Max}\{x_{i,j}^p\};$$

$$\text{Min}^p = \text{Min}\{x_{i,j}^p\};$$

$$x_{i,j}^p = \text{Original Pixel}(i, j) \text{ of Image}(p);$$

$$a_{i,j}^{p[n]} = \text{Scaled and Stretched Pixel}(i, j) \text{ of Image}(p);$$

Neighbor smallest:

$$d_{i,j,i+k,j+z}^{p[n]} = \sum_{m=-G}^{G} \sum_{n=-G}^{G} \left( a_{i+m,j+n}^{p[n]} - w_{i+m,j+n,i+k,j+z}^{[n]} \right)^2;$$

$$r_{i,j}^{*[n]} = \underset{i+k}{\operatorname{argmin}} \left\{ d_{i,j,i+k,j+z}^{p[n]} \right\};$$

$$c_{i,j}^{*[n]} = \underset{j+z}{\operatorname{argmin}} \left\{ d_{i,j,i+k,j+z}^{p[n]} \right\};$$

$$s_{i,j}^{*[n]} = \underset{p}{\operatorname{argmin}} \left\{ d_{i,j,i+k,j+z}^{p[n]} \right\};$$

Weights updating:

$$w_{i+k,j+z,r_{i,j}^*,c_{i,j}^*}^{[n+1]} = w_{i+k,j+z,r_{i,j}^*,c_{i,j}^*}^{[n]} + \alpha \cdot \left( a_{i+k,j+z}^{s_{i,j}^{*[n]}} - w_{i+k,j+z,r_{i,j}^*,c_{i,j}^*}^{[n]} \right); \quad (5)$$

-continued $$\overline{w_{i,j}^{[n]}} = \frac{1}{(1+2\cdot G)^2} \cdot \sum_{k=-G}^{G}\sum_{z=-G}^{G} w_{i+k,j+z,r_{i,j}^*,c_{i,j}^*}^{[n]};$$

States Updating:

$$\begin{cases} a_{i+k,j+z}^{p[n+1]} = \dfrac{a_{i+k,j+z}^{p[n]} + \alpha \cdot \left(1.0 - a_{i+k,j+z}^{p[n]}\right) \cdot}{\left(w_{i+k,j+z,r_{i,j}^*,c_{i,j}^*}^{[n]} - \overline{w_{i,j}^{[n]}}\right)} & \text{if } \left(w_{i+k,j+z,r_{i,j}^*,c_{i,j}^*}^{[n]} > \overline{w_{i,j}^{[n]}}\right) \\ a_{i+k,j+z}^{p[n+1]} = \dfrac{a_{i+k,j+z}^{p[n]} + \alpha \cdot a_{i+k,j+z}^{p[n]} \cdot}{\left(w_{i+k,j+z,r_{i,j}^*,c_{i,j}^*}^{[n]} - \overline{w_{i,j}^{[n]}}\right)} & \text{if } \left(w_{i+k,j+z,r_{i,j}^*,c_{i,j}^*}^{[n]} < \overline{w_{i,j}^{[n]}}\right) \end{cases};$$

Visualization of new image:

$$Pixel_{i,j}^{[n]} = ScaleW \cdot \overline{w_{i,j}^{[n]}} + OffsetW;$$

$$ScaleW = \frac{HighestPixelsResolution - LowestPixelsResolution}{MaxW - MinW};$$

$$OffsetW = \frac{MaxW \cdot LowestPixelsResolution - MinW \cdot HighestPixelsResolution}{MaxW - MinW};$$

$$MaxW = \underset{i,j}{\text{Max}}\{\overline{w_{i,j}^{[n]}}\};$$

$$MinW = \underset{i,j}{\text{Min}}\{\overline{w_{i,j}^{[n]}}\}$$

and printing or displaying the new image on a printing substrate or with a displaying device.

2. The method according to claim 1, wherein the source images are at least two images of the same subjects acquired by means of different image sensors or physical effects.

3. The method according to the claim 1, wherein the source images to be fused are three-dimensional images, said images being subdivided in a series of adjacent image slices each one being a two dimensional image, the steps of claim 1 being applied for each slice image of the three-dimensional source images, generating fused image slices from which a fused three-dimensional image is reconstructed.

4. The method according to claim 1, wherein the at least two source images to be fused are one and the same image.

5. The method according to claim 1, wherein one or more of the pixels or voxels of new image generated by fusion from the source images or the image data relating to said new image are the inputs of a image processing method or of a combination of image processing methods.

* * * * *